April 10, 1934. J. M. POWELL 1,954,713
CARRIAGE SUPPORTING MEANS
Filed Jan. 5, 1934

Inventor
John Mills Powell.
By Cushman, Darby, & Cushman
Attorneys

Patented Apr. 10, 1934

1,954,713

UNITED STATES PATENT OFFICE 1,954,713

CARRIAGE SUPPORTING MEANS

John Mills Powell, Galax, Va.

Application January 5, 1934, Serial No. 705,427

8 Claims. (Cl. 242—84.4)

The present invention relates to mechanism including a shaft on which a carriage is traversable and the principal object of the invention is to improve the bearing of the carriage on the shaft. The invention is applicable particularly in cases where for certain reasons the length of the carriage bearing is necessarily restricted. The object of the invention is accomplished by providing a bushing which is interposed between the carriage and the shaft and is slidable relative to both.

While the invention is applicable to mechanisms of varied nature, it is particularly applicable to level-winding apparatus. Since all of the problems which it is the purpose of the invention to meet are presented in the case of a level-winding fishing reel, I shall describe the invention with reference to such a device by way of example.

In the accompanying drawing:—

Figure 1:
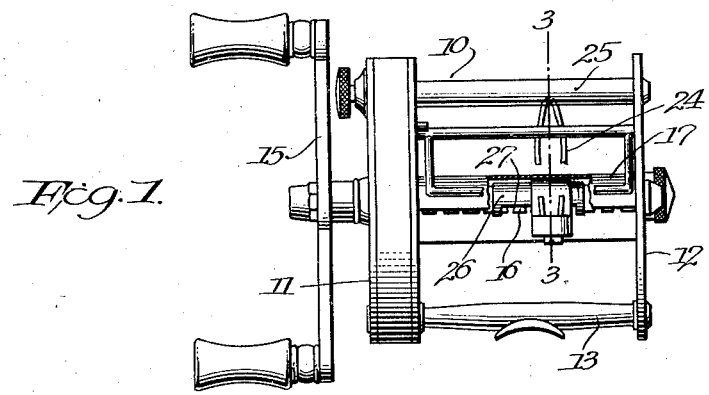
Figure 1 is a front elevation of a fishing reel embodying the present invention.
Figure 2:
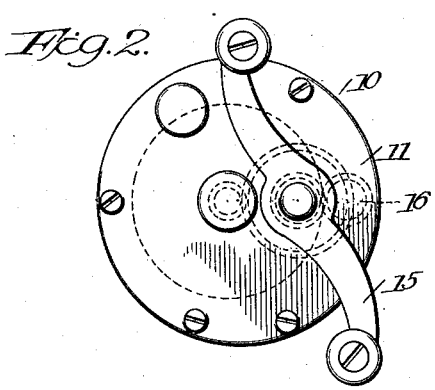
Figure 2 is a side elevation of the reel of Figure 1.
Figure 3:
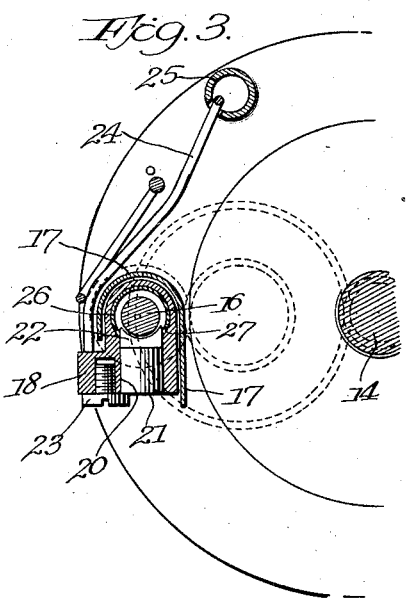
Figure 3 is a section on line 3—3 of Figure 1.

Referring to the drawing, reference numeral 10 designates generally a fishing reel which may be of any preferred type so long as it is equipped with level-winding devices. In the present instance, the reel comprises fixed wall portions 11 and 12 rigidly connected in parallel spaced relation by a number of cross braces or bars as at 13. A winding drum 14 is journaled in the walls 11 and 12 and, through suitable connections disposed within wall 11, is adapted to be rotated by a crank 15. At the front of the reel, a reversely threaded screw shaft 16 is journaled in walls 11 and 12 in parallel relation to the drum 14 and is likewise adapted to be rotated by crank 15. A line guard 17 partially surrounds the screw shaft in spaced relation thereto and extends between walls 11 and 12 to be rigidly supported thereby. A line guide carriage 18 has a body provided with a bore 19 which receives the screw shaft 16. In a counterbore 20 in the body is arranged the cylindrical portion of a rocking pawl 21 which has a tooth 22 engaged with the screw shaft. The pawl is held in place by means of a cap screw 23.

The screw shaft is provided with right and left hand threads so that under its continuous rotation the carriage is continuously reciprocated, due to the engagement of the pawl tooth 22 with the screw thread, the carriage moving within guard 17.

Mounted on the carriage is a wire loop or eyelet 24 whose upper end extends in an elongated slot formed in a cross member 25, the upper end of the loop being guided in this slot as the carriage is reciprocated and serving to steady the loop and the carriage. As will be understood, the line is threaded through the loop or eyelet and, while being wound on the drum, is carried back and forth to effect level-winding, the line sliding along guard 17 as it is being wound.

All of the mechanism so far referred to in the drawing is known and per se is no part of the present invention.

Since the reel must be compact and since the line must be moved from end to end of the winding drum, carriage 18 is necessarily of very limited extent in the axial direction of the screw shaft 16. In use, the carriage is subject to heavy strains acting eccentrically thereon in the axial direction of the screw shaft. Consequently, in view of its limited bearing surface on the screw shaft, it is subjected to severe wear. The ends of the bore 19 eventually become enlarged, due to this wear, so that the reel no longer functions properly. Backlash occurs and there is a tendency for tooth 22 to jam in the threads. However, if the bearing surface of the bore is increased by elongating the carriage, either special provisions for clearance must be made at the ends of the screw shaft or else the limits of movement of the carriage must be correspondingly approached, which would mean that the usable length of drum 14 would be correspondingly curtailed.

It is the particular purpose of the present invention to provide increased bearing surface in such a manner as to overcome these objections. In the practice of the present invention, the arrangement and form of the parts of the ordinary reel need be in no wise affected and at the same time, full range of level-winding is retained.

According to the invention, there is provided a bushing 26 which is slidable in bore 19 of the carriage and is also slidable on screw shaft 16, the bushing having a close but easy fit with both of these elements and being preferably formed of some non-rusting metal, such as brass. The sleeve is of considerably greater length in the axial direction of screw shaft 16 than is the carriage and its bore 19 and is provided with a longitudinally extending slot 27 through which the pawl tooth 22 projects freely. While the length of the bushing is subject to variation under different circumstances, in the case of fishing reels it is preferably about one-half the effective length of the screw shaft. With this increased bearing surface, the carriage is maintained in proper relation to the screw shaft, that is, with the axis of pawl 21 at right angles to the shaft axis. It will be understood that in view of the provision of the bushing eccentric stresses have a greatly diminished leverage effect and there is no danger of tooth 22 binding in the threads.

Figure 4:
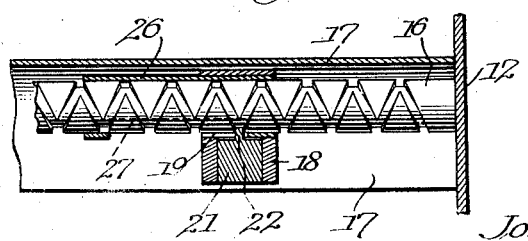
Figure 4 is a fragmentary view particularly showing the carriage and sleeve in section substantially on the axial line of the screw shaft.

At each limit of its movement, the carriage comes very close to one of the walls 11 or 12. Referring to Figure 4, it is assumed that the carriage is moving to the left, with the bushing projecting therefrom in the direction of advance as shown. As the left hand end of the bushing strikes wall 11, movement of the bushing relative to the shaft and with the carriage is arrested so that the carriage now moves along the stationary bushing, slot 27 being of such length that the end of the bushing may be received entirely in bore 19, if necessary, without interference with the pawl tooth. As the carriage reaches its left hand limit and reverses, bushing 26 will ordinarily be at once carried therewith to the right, projecting to its full extent in the direction of advance until arrested by contact with wall 12. There is a slightly predominant friction effect between the bushing and bore 19 as compared to that between the bushing and the rotating screw shaft 16 so that, as just stated, the bushing ordinarily moves at once with the carriage. If the sleeve should lag, its movement with the carriage would eventually be enforced through contact of tooth 22 with an end wall of slot 27, the tooth and slot forming in effect a lost motion connection or abutment devices. In Figure 4, note that the right hand end of the bushing is entirely within bore 19 so as to be flush with the adjacent carriage surface. In this extreme position of the bushing, it will be seen that there is still a slight clearance between pawl tooth 22 and the right hand end of slot 27.

Not only does the bushing support the carriage against eccentric stresses and steady the pawl tooth, but it also reduces the amount of wear due to movement. The carriage, instead of sliding the whole length of the screw shaft in contact with the screw threads, slides only the length of the bushing and on the smooth surfaces thereof, once for each traverse. Two pairs of contacting, relatively slidable surfaces are provided.

The bushing may be applied in original manufacture of the reel or may be added later. For example, a worn carriage can be re-bored and the bushing applied. In either case, the added cost is negligible.

As above stated, I have preferred to describe the invention with reference to a fishing reel, since such a device presents all the difficulties which the present invention is designed to overcome and the invention can be very advantageously applied thereto. However, I wish to emphasize again that the invention is of general application. It is not confined in use to association with a double threaded screw shaft, as shown, but may obviously be used in the case of a single threaded reversible screw shaft or in the case of a smooth shaft. It will be understood that the bushing itself is susceptible of variation in material, design, and size and accordingly, I do not limit myself in these respects.

I claim:—

1. In mechanism including a shaft and a carriage comprising a portion to be borne on said shaft and reciprocable therealong between limit positions, the combination of a bushing interposed between said carriage portion and shaft, said bushing being slidable relative to both said carriage portion and said shaft and having a substantially greater length in the axial direction of said shaft than said carriage portion, movement of the bushing relative to said carriage portion permitting the latter to move to its limit positions.

2. In mechanism including a shaft and a carriage comprising a portion to be borne on said shaft and reciprocable therealong between limit positions, the combination of a bushing interposed between said carriage portion and shaft, said bushing being slidable relative to both said carriage portion and said shaft and having a substantially greater length in the axial direction of said shaft than said carriage portion, movement of the bushing relative to said carriage portion permitting the latter to move to its limit positions, and a lost motion connection between said carriage and said shaft.

3. In mechanism including a shaft and a carriage comprising a portion to be borne on said shaft and reciprocable therealong between limit positions, the combination of a bushing interposed between said carriage portion and shaft, said bushing being slidable relative to both said carriage portion and said shaft and having a substantially greater length in the axial direction of said shaft than said carriage portion, movement of the bushing relative to said carriage portion permitting the latter to move to its limit positions, and each end of said bushing being movable to a flush relation with the adjacent end of said carriage portion.

4. In mechanism including a traversing screw shaft, a carriage comprising a portion to be borne on said screw shaft, and means on said carriage engaging the screw shaft to cause movement of the carriage between limit positions along the screw shaft upon rotation of the screw shaft, the combination of a bushing interposed between said carriage portion and said screw shaft, said bushing being slidable relative to both said carriage portion and said screw shaft, and having a length greater than that of said carriage portion, movement of said bushing relative to the carriage permitting the carriage to move to its limit positions.

5. In mechanism including a traversing screw shaft, a carriage comprising a portion to be borne on said screw shaft, and means on said carriage engaging the screw shaft to cause movement of the carriage between limit positions along the screw shaft upon rotation of the screw shaft, the combination of a bushing interposed between said carriage portion and said screw shaft, said bushing being slidable relative to both said carriage portion and said screw shaft, and having a length greater than that of said carriage portion, movement of said bushing relative to the carriage permitting the carriage to move to its limit positions, and a lost motion connection between the carriage and said bushing to enforce movement of the latter with the former.

6. In mechanism including a traversing screw shaft, a carriage comprising a portion to be borne on said screw shaft, and a pawl carried by said portion and engaging the screw shaft to cause movement of the carriage between limit positions along the screw shaft upon rotation of the screw shaft, the combination of a bushing interposed between said carriage portion and said screw shaft and provided with a longitudinally extending slot through which said pawl extends, said bushing being slidable relative to both said carriage portion and said screw shaft and having a length greater than that of said carriage portion, movement of the bushing relative to said carriage portion permitting the carriage to move to its limit position, engagement of the pawl with the ends of said slot enforcing movement of the bushing with the carriage.

7. In mechanism including a traversing screw shaft, a carriage having a body portion provided with a bore receiving the screw shaft for supporting the carriage on the screw shaft, and a pawl projecting in said bore and engaging the screw shaft to cause movement of the carriage between limit positions along the screw shaft upon rotation of the screw shaft, the combination of a bushing in said bore surrounding the screw shaft and provided with a longitudinally extending slot through which said pawl extends, said bushing being slidable in said bore and on said screw shaft and having a length substantially greater than that of the bore, movement of the bushing in said bore permitting the carriage to move to its limit positions, engagement of the pawl with the ends of said slot enforcing movement of the bushing with the carriage.

8. In a level-winding fishing reel, said reel comprising a frame having side walls, a rotatable reversely threaded traversing shaft extending between said walls, a line guide carriage having a bore receiving said shaft for supporting said carriage on said shaft, and a rocking pawl projecting in said bore and engaging said shaft to cause reciprocating movement of said carriage along the shaft upon rotation of the latter, the limits of travel of said carriage being closely adjacent said side walls, the combination of a bushing in said bore surrounding the shaft and provided with a longitudinally extending slot through which said pawl extends, said bushing being slidable in said bore and on said shaft and having a length substantially greater than that of said bore, movement of the bore along said bushing caused by abutment of the bushing with said side walls permitting the carriage to move to its limit positions, engagement of the pawl with the ends of said slot enforcing movement of the bushing with the carriage.

JOHN MILLS POWELL.